United States Patent [19]

Sato et al.

[11] 4,372,335

[45] Feb. 8, 1983

[54] FLOW DIVIDER VALVE ASSEMBLY

[75] Inventors: Hideyori Sato, Funabashi; Nobuaki Inaba, Yokohama; Shigeru Shinohara, Tokyo, all of Japan

[73] Assignee: Kabushiki Kaisha Komatsu Seisakusho, Tokyo, Japan

[21] Appl. No.: 237,769

[22] Filed: Feb. 24, 1981

[30] Foreign Application Priority Data

Feb. 29, 1980 [JP] Japan ............................ 55-24934[U]

[51] Int. Cl.[3] ............................................ G05D 11/03

[52] U.S. Cl. ...................................... 137/101; 137/117

[58] Field of Search ................... 137/101, 117; 60/422

[56] References Cited

U.S. PATENT DOCUMENTS

| | | | |
|---|---|---|---|
| 2,956,577 | 10/1960 | Kirkham | 137/101 |
| 3,385,311 | 5/1968 | Allen | 137/101 |
| 3,421,532 | 1/1969 | Davidson | 137/101 |
| 3,744,509 | 7/1973 | Teubler | 137/101 X |
| 3,818,926 | 6/1974 | Wohlwend | 137/101 |
| 3,983,893 | 10/1976 | Nubson | 137/101 |
| 4,154,257 | 5/1979 | Adachi | 137/101 |

FOREIGN PATENT DOCUMENTS 1128657 10/1968 United Kingdom .

*Primary Examiner*—Robert G. Nilson
*Attorney, Agent, or Firm*—Armstrong, Nikaido, Marmelstein & Kubovcik

[57] ABSTRACT

A flow divider valve assembly for dividing a flow of fluid between a priority flow device, such as a power steering system, and an excess flow device, such as an auxiliary mechanism. The flow divider valve assembly comprises a valve body defining an inlet port to be connected to a source of fluid under pressure, a priority flow outlet port, an excess flow outlet port and a valve bore interconnecting the ports, and a valve spool axially movable within the valve bore, the valve spool having formed therein an axial bore for permitting a constant communication between the inlet port and the priority flow outlet port. A first restrictor is disposed between the inlet port and the priority flow outlet port and a second restrictor is disposed between the inlet port and the excess flow outlet port. Restriction rate of the first restrictor is made larger than that of the first restrictor.

3 Claims, 2 Drawing Figures

FLOW DIVIDER VALVE ASSEMBLY

BACKGROUND OF THE INVENTION

This invention relates generally to an improvement of a flow divider valve assembly for use in the steering system hydraulic circuit of construction vehicles.

A preferential flow divider valve assembly which has heretofore been employed in the steering system hydraulic circuits of construction vehicles serves to supply a part of the fluid delivered by a hydraulic pump at a controlled flow rate into the hydraulic circuit of the steering system to steer the vehicle thereby and to supply the remaining fluid flow into the hydraulic circuit of the implement to operate the implement thereby. However, such prior art flow divider valve is disadvantageous in that when the pump output flow rate is low, for example, during the engine mounted on the vehicle being under idling condition, most part of the fluid delivered by the pump will flow into the steering circuit of the steering system so that the implement cannot be operated during such period.

SUMMARY OF THE INVENTION

It is therefore an object of the present invention to provide a flow divider valve assembly which is capable of directing flow of fluid to an excess flow outlet port, connectible to an auxiliary device such as hydraulic cylinder for an implement, even at low idling of an engine.

Another object of the present invention is to provide a flow divider valve assembly wherein the controlled flow rate to a priority flow outlet port connectible to a power steering system is gradually increased in response to an increase of the flow rate from a pump.

In accordance with an aspect of the present invention, there is provided a flow divider valve assembly, comprising: a valve body defining an inlet port to be connected to a source of fluid under pressure, a priority flow outlet port, an excess flow outlet port and a valve bore interconnecting said ports; a valve spool axially movable within said valve bore, said valve spool having formed therein an axial bore for permitting a constant communication between said inlet port and said priority flow outlet port; biasing means disposed in the axial bore of said valve spool for biasing said valve spoool in a direction toward opening said priority flow outlet port; first restrictor means disposed between said inlet port and said priority flow outlet port for adjustably restrict the flow rate thereacross thereby allowing a controlled flow rate to pass therethrough; and second restrictor means disposed between said inlet port and said excess flow outlet port for adjustably restrict the flow rate thereacross, said second restrictor means allowing to gradually increase said controlled flow rate when the rate of flow from said inlet port to said excess flow outlet port increases.

The above and other objects, features and advantages of the present invention will be readily apparent from the following description taken in conjunction with the accompanying drawings.

DESCRIPTION OF THE PREFERRED EMBODIMENT

Figure 1:
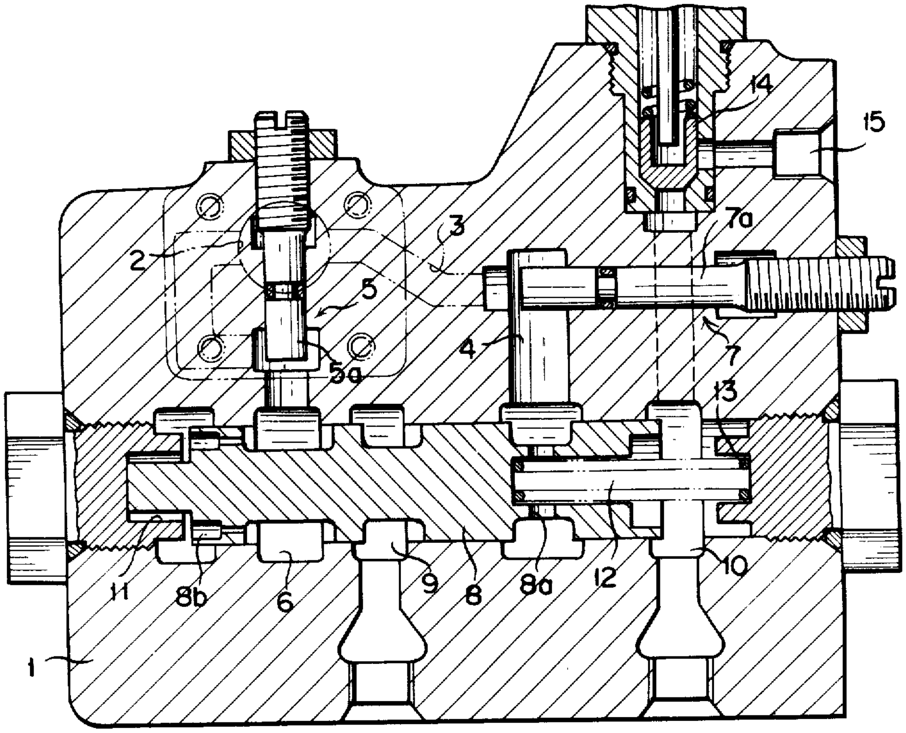
FIG. 1 is a cross-sectional view of a flow divider valve assembly according to the present invention.

The present invention will now be described in detail below by way of example only with reference to the accompanying drawings. In FIG. 1, reference numeral 1 denotes a flow divider valve body having an inlet port 2 connected to the delivery side of a hydraulic pump not shown. The arrangement is made such that a part of the fluid flowing into the inlet port 2 is supplied through a passage 3 into a port 4 at a controlled flow rate, whilst the remaining fluid is adjusted in flow rate by means of spool 5*a* of an adjustable restrictor 5 and then is supplied into a port 6. Formed in an opening on the side of the port 4 of the passage 3 is an adjustable control restrictor 7 having a spool 7*a* mounted therein which can be turned from the outside of the body 1 so as to regulate the flow rate of the controlled flow. The restriction rate of the control restrictor 7 is set to be greater than that of the restrictor 5. The above-mentioned ports 4 and 6 are formed in the periphery of a pressure compensating spool 8 accommodated in a bore of the body 1. An excess flow outlet port 9 is formed between the ports 4 and 6, and a priority flow outlet port 10 is formed to the right hand of the port 4. Further, defined on one side of the above-mentioned pressure compensating spool 8 is a fluid pressure receiving chamber 11 and on the other side thereof is an axial bore 12 communicating with the priority flow outlet port 10. Accommodated with the axial bore 12 is a compression spring 13 which urges the pressure compensating spool 8 towards the fluid pressure receiving chamber 11. The axial bore 12 communicates with the port 4 through holes 8*a* formed in the pressure compensating spool 8. Further, the port 6 communicates with the fluid pressure receiving chamber 11 through pilot holes 8*b* formed in the pressure compensating spool 8. Reference numeral 14 denotes a relief valve which serves to relieve the fluid into drain port 15 when the pressure of the fluid in the priority flow outlet port 10 has become abnormally high.

The operation of the flow divider valve assembly according to the present invention will now be described below. When the hydraulic pump not shown is started to be driven by the engine, the pressurized fluid introduced into the inlet port 2 is supplied through the passage 3, port 4, axial bore 12 and priority flow outlet port 10 into the power steering system not shown thereby driving the steering system. The pressurized fluid introduced into the inlet port 2 is also supplied into the port 6 and flows through the pilot holes 8*b* into the fluid pressure receiving chamber 11 thereby to urge the pressure compensating spool 8 rightwards in the drawing against the biasing force of the spring 13 and the fluid pressure within the priority flow outlet port 10. It can be seen from the graph of FIG. 2 that the controlled flow rate through the priority flow outlet port 10 will increase rectilinearly with the increase of pump output flow rates up to the point "M." This is because the fluid flow to the excess flow outlet port 9 is still blocked by the spool 8, and FIG. 1 shows this condition. When the pump output flow rate increases beyond the point "M" in FIG. 2, the pressure within the fluid pressure receiving chamber 11 will become high enough to urge the spool 8 rightwards thereby enabling the fluid to be supplied into the excess flow outlet port 9.

Figure 2:
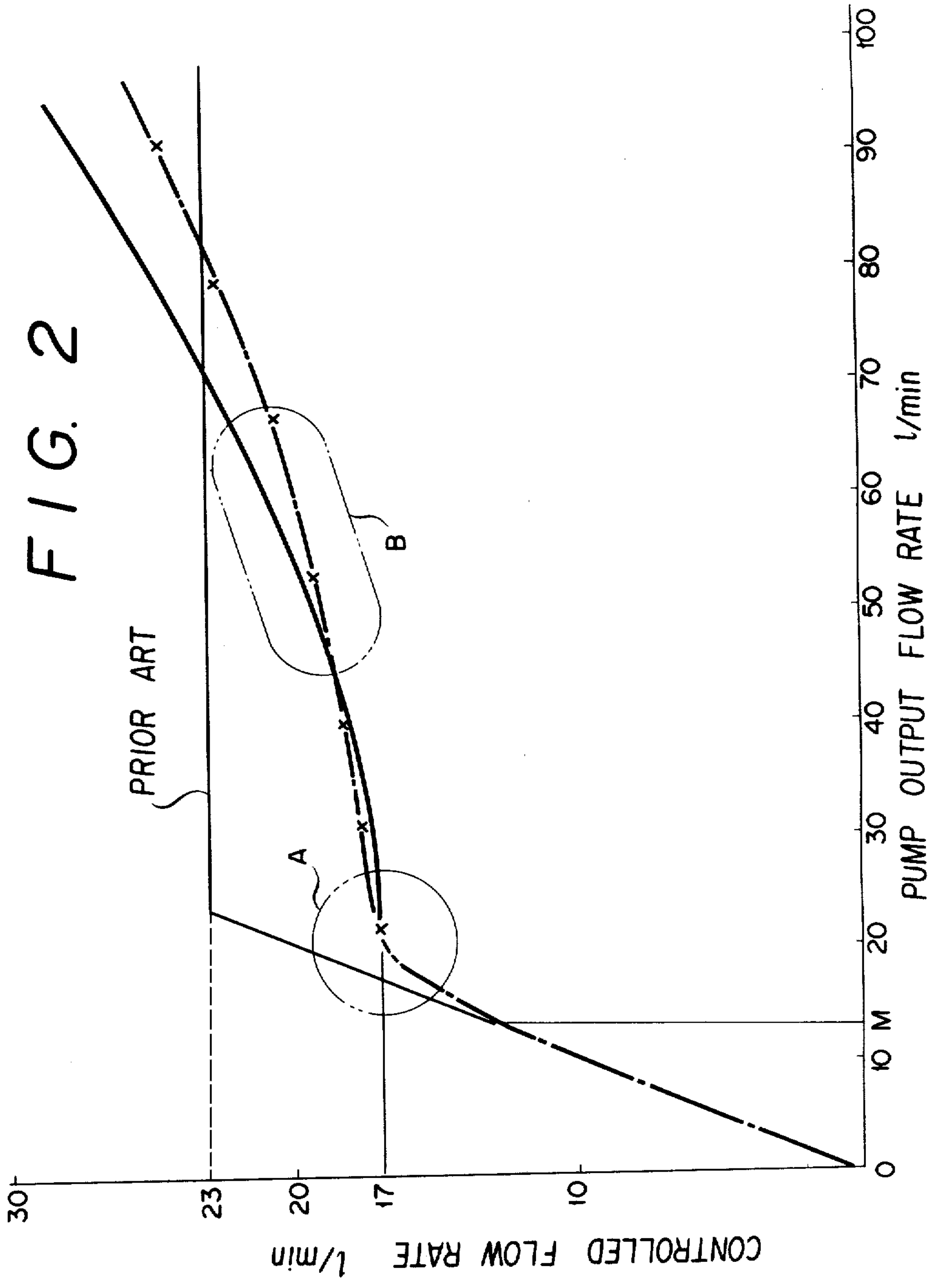
FIG. 2 is a graph showing how the controlled flow rate to a priority flow outlet port is increased in response to the pump output flow rate.

As seen in FIG. 2, when the hydraulic pump driving engine is under low idling condition, the pump output flow rate is kept at about 20 liters per minute. It is obvious from the graph illustrated in FIG. 2 that the pressurized fluid can be supplied into the excess flow outlet port 9 which is connected with the implement's hydraulic circuit even when the engine is under low idling condition.

As the flow rate of the pressurized fluid into the inlet port 2 increases, the pressure loss of the fluid caused by the adjustable restrictor 5 will increase, thereby decreasing fluid pressure in the port 6. Therefore, the fluid pressure within the fluid pressure receiving chamber 11 will decrease with the increase of the flow rate so that the pressure compensating spool 8 is moved leftwards by the resilient force of the compression spring 13 and the fluid pressure within the axial bore 12, thereby reducing the fluid flow rate into the excess flow outlet port 9.

Whilst, with the leftward movement of the pressure compensating spool 8, the controlled flow rate directed towards the priority flow outlet port 10 will increase and at that time the pressure loss of the fluid by the control restrictor 7 will also increase, and the controlled flow rate characteristic relative to pump output flow rates will be as shown in FIG. 2. Stating in brief, when the pump output flow rate is considerably low and the pressure loss of the fluid in the adjustable restrictor 5 is negligibly small as compared to that in the control restrictor 7 (i.e., in the part shown by A in FIG. 2), the controlled flow rate is mainly determined by means of the control restrictor 7. However, when the pump output flow rate increases further with a resultant increase in the pressure loss through the adjustable restrictor 5 which is not negligibly small as compared to the pressure loss in the control restrictor 7 (i.e., in the part shown by B in FIG. 2), the controlled flow rate characteristic will gradually increase under the large influence of the pressure loss across the adjustable restrictor 5 and the rate of increase thereof can be controlled as desired by adjusting the adjustable restrictor 5.

As described in detail hereinabove, according to the present invention, even when the pump output flow rate is low an excess fluid flow rate can be secured thereby enabling the use of the implement, and also because the conrolled flow rate which can be set at a desired value by means of the adjustable restrictor will gradually and smoothly increase, an improvement of the steering performance can be achieved so that unnatural feeling in steering the vehicle can be completely eliminated.

It is to be understood that the foregoing description is merely illustrative of a preferred embodiment of the present invention, and that the scope of the invention is not to be limited thereto, but is to be determined by the scope of the appended claims.

What we claim is:

1. A flow divider valve assembly, comprising:

a valve body defining an inlet port to be connected to a source of fluid under pressure, a priority flow outlet port, an excess flow outlet port and a valve bore interconnecting said ports;

a valve spool axially moveable within said valve bore, said valve spool having formed therein an axial bore for permitting a constant communication between said inlet port and said priority flow outlet port;

biasing means disposed in the axial bore of said valve spool for biasing said valve spool in a direction toward opening said priority flow outlet port;

first restrictor means disposed between said inlet port and said priority flow outlet port for adjustably restricting the flow rate thereacross thereby allowing a controlled flow rate to pass therethrough; and second restrictor means disposed between said inlet port and said excess flow output port for adjustably restricting the flow rate thereacross, said second restrictor means being adapted to gradually increase said controlled flow rate through said first restrictor means when the rate of flow from said inlet port to said excess flow outlet port increases.

2. A flow divider valve assembly as recited in claim 1 further comprising a first plug closing one end of said valve bore thereby defining a fluid pressure receiving chamber between said first plug and one end of said valve spool and a second plug closing the other end of said valve bore wherein said biasing means is disposed between the other end of said valve spool and said second plug through the axial bore of said valve spool.

3. A flow divider valve assembly as recited in claim 1 or 2 wherein the restriction rate of said first restrictor means is larger than that of said second restrictor means.

* * * * *